(12) United States Patent
Furusawa et al.

(10) Patent No.: US 9,878,604 B2
(45) Date of Patent: Jan. 30, 2018

(54) LIQUID-SEALED ANTIVIBRATION DEVICE (71) Applicant: TOYO TIRE & RUBBER CO., LTD., Osaka-shi, Osaka (JP)

(72) Inventors: Norimitsu Furusawa, Osaka (JP); Tatsuki Ikawa, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 14/979,763

(22) Filed: Dec. 28, 2015

(65) Prior Publication Data
US 2016/0186830 A1   Jun. 30, 2016

(30) Foreign Application Priority Data

Dec. 25, 2014   (JP) .................................. 2014-262494

(51) Int. Cl.
*B60K 5/12* (2006.01)
*F16F 13/10* (2006.01)
*F16F 13/26* (2006.01)

(52) U.S. Cl.
CPC .......... *B60K 5/1208* (2013.01); *F16F 13/105* (2013.01); *F16F 13/264* (2013.01)

(58) Field of Classification Search
CPC ............. F16F 13/00; F16F 13/08; F16F 13/10
See application file for complete search history.

(56) References Cited

U.S. PATENT DOCUMENTS

| 6,158,724 | A  | * | 12/2000 | Takashima | ............ | F16F 13/103 |
| | | | | | | 267/140.13 |
| 6,808,167 | B2 | * | 10/2004 | Kodama | ............... | F16F 13/101 |
| | | | | | | 267/140.13 |
| 2002/0000688 | A1 | * | 1/2002 | Simuttis | .................. | F16F 13/10 |
| | | | | | | 267/140.13 |
| 2002/0036371 | A1 | * | 3/2002 | Ihara | ..................... | F16F 13/103 |
| | | | | | | 267/140.13 |
| 2009/0224445 | A1 | * | 9/2009 | Hatakeyama | ........... | F16F 13/18 |
| | | | | | | 267/140.12 |

FOREIGN PATENT DOCUMENTS

JP   2014-85003 A   5/2014

* cited by examiner

*Primary Examiner* — Bradley King
*Assistant Examiner* — James Hsiao
(74) *Attorney, Agent, or Firm* — Westerman, Hattori, Daniels & Adrian, LLP (57) ABSTRACT

[Problem] To provide a liquid-sealed antivibration device capable of improving the position accuracy of an outer fitting member and a diaphragm.
[Solution] Since a cylindrical outer fitting member 11 with an outer edge part of a diaphragm 10 connected thereto is externally fitted on a partition member 20 at an area on an inner peripheral surface of the outer fitting member 11 where the diaphragm 10 is not connected, that is, since the diaphragm 10 is not interposed between the partition member 20 and the outer fitting member 11, the position relation of the outer fitting member 11 to the partition member 20 can be stabilized, so that the outer fitting member 11 can be restrained from inclining relative to the partition member 20.

7 Claims, 5 Drawing Sheets

LIQUID-SEALED ANTIVIBRATION DEVICE

TECHNICAL FIELD

The present invention relates to a liquid-sealed antivibration device, and in particular, to a liquid-sealed antivibration device capable of improving the position accuracy of an outer fitting member and a diaphragm.

BACKGROUND ART

Heretofore, as liquid-sealed antivibration devices used for motor vehicles, there has been known a liquid-sealed antivibration device which comprises a first attaching member, a cylindrical second attaching member, an antivibration base body connecting these first attaching member and second attaching member and constituted by a rubber-like elastic body, a diaphragm defining a liquid-sealed chamber between itself and the antivibration base body and constituted by a rubber-like elastic body, a partition member dividing the liquid-sealed chamber, and an orifice making communication between the liquid-sealed chambers divided by the partition member.

Patent Literature 1 discloses a technology wherein an outer edge part of a diaphragm is vulcanization-bonded (connected) to a cylindrical diaphragm attachment (outer fitting member) having a larger inside diameter than the outside diameter of a partition member, wherein the diaphragm attachment is externally fitted with the diaphragm interposed between itself and the partition member, and wherein a second attaching member is subjected to a diameter reduction process.

CITATION LIST

Patent Literature

[Patent Literature 1] JP-A No. 2014-85003 (for example, paragraph 0043, FIG. 1 and the like)

SUMMARY OF THE INVENTION

Technical Problem

However, in the aforementioned related art, due to the diaphragm interposed between the partition member and the diaphragm attachment (outer fitting member), the position relation becomes unstable between these partition member and diaphragm attachment, so that the diaphragm attachment is apt to incline relative to the partition member. That is, an anxiety arises in that the second attaching member is subjected to the diameter reduction process with the diaphragm attachment inclining relative to the partition member or that the diaphragm attachment inclines relative to the partition member at the time of the diameter reduction process of the second attaching member. This gives rise to a problem that the diaphragm attachment and the diaphragm are insufficient in position accuracy.

The present invention has been made in order to address the aforementioned problem, and an object of the present invention is to provide a liquid-sealed antivibration device capable of improving the position accuracy of an outer fitting member and a diaphragm.

Solution to Problem and Advantageous Effects of Invention

According to the liquid-sealed antivibration device described in Claim 1, since a cylindrical outer fitting member with an outer edge part of a diaphragm connected thereto is externally fitted on a partition member at an area on an inner peripheral surface of the outer fitting member to which area the diaphragm is not connected, that is, since the diaphragm is not interposed between the partition member and the outer fitting member, the position relation of the outer fitting member to the partition member can be stabilized, so that the outer fitting member can be restrained from inclining relative to the partition member. Further, since the partition member is provided with a protruding portion which protrudes radially outward from an outer peripheral surface and with which an axial end surface of the externally fitted outer fitting member is brought into contact, it is possible to position the outer fitting member relative to the partition member, and hence, the outer fitting member can be restrained from inclining relative to the partition member. As a result, it can be restrained that a second attaching member is subjected to a diameter reduction process with the outer fitting member inclining relative to the partition member or that the outer fitting member inclines relative to the partition member at the time of the diameter reduction process of the second attaching member. Therefore, the outer fitting member and the diaphragm can be improved in position accuracy.

According to the liquid-sealed antivibration device described in Claim 2, in addition to the advantageous effects attained in the liquid-sealed antivibration device described in Claim 1, since the outer fitting member is set so that the axial length of an area where the diaphragm is not connected to the inner peripheral surface of the outer fitting member is longer than the axial length from an axial end surface of the partition member to the protruding portion, the partition member can be restrained from interfering at its axial end surface with the diaphragm when the outer fitting member is externally fitted on the partition member. Therefore, it can be restrained that such interference would cause the damage of the diaphragm and the separation at the adhesive interface.

According to the liquid-sealed antivibration device described in Claim 3, in addition to the advantageous effects attained in the liquid-sealed antivibration device described in Claim 1, since concavities are formed to be hollow on the outer peripheral surface of the partition member, the contact area of the outer fitting member with the outer peripheral surface of the partition member can be made to be reduced by the concavities. As a result, the outer fitting member can be externally fitted on the partition member smoothly.

In this case, although the same effects can be obtained by providing concavities on the inner peripheral surface of the outer fitting member, the outer fitting member like this is thin in thickness, and this makes the machining of the concavities difficult and results in lowering the strength. In contrast, in the configuration that the concavities are provided to be hollow in the partition member being relatively thick, the decrease in strength can be restrained. Further, determining the place for the concavities to be hollow as the outer peripheral surface makes the machining of the concavities easy in comparison with determining that as the inner peripheral surface.

According to the liquid-sealed antivibration device described in Claim 4, in addition to the advantageous effects attained in the liquid-sealed antivibration device described in Claim 1, since the partition member is formed with convex portions whose extreme ends each take a semicircularly curved shape as viewed in the axial direction, and since the extreme ends of the convex portions are held in contact with the inner peripheral surface of the outer fitting member, the outer fitting member can be externally fitted on the partition member with the extreme ends of the convex portions held in contact with the outer fitting member. Therefore, since it is possible to confine the contact area between the partition member and the outer fitting member to the extreme end surfaces of the convex portions only, the contact area between the partition member and the outer fitting member can be made small by that amount. As a result, the outer fitting member can be externally fitted on the partition member smoothly.

According to the liquid-sealed antivibration device described in Claim 5, in addition to the advantageous effects attained in the liquid-sealed antivibration device described in Claim 1, since a film portion arranged on an inner peripheral surface of the second attaching member is closely adhered to the protruding portion of the partition member and the outer fitting member when the second attaching member is subjected to the diameter reduction process, a liquid-tight sealing can be attained between the partition member and the outer fitting member (on the external fitting surface). That is, in the present invention, the diaphragm is not interposed between the partition member and the outer fitting member, and thus, while an anxiety arises that liquid leaks out of the second chamber of the fluid-sealed chamber through between the partition member and the outer fitting member, it can be restrained with the configuration of Claim 5 that liquid leaks out of the second chamber.

According to the liquid-sealed antivibration device described in Claim 6, in addition to the advantageous effects attained in the liquid-sealed antivibration device described in Claim 5, since the thickness dimension of the outer fitting member is set to the same dimension as, or smaller dimension than, the protruding dimension of the protruding portion from the outer peripheral surface of the partition member, the outer peripheral surface of the outer fitting member can be restrained from protruding radially outward beyond the extreme end surface of the protruding portion. Thus, when the partition member with the outer fitting member externally fitted thereon is inserted into the second attaching member, such a situation can be restrained that a resistance in the opposite direction to the inserting direction acts from the film portion to the outer fitting member to cause position aberration. Therefore, it is possible to improve the position accuracy of the outer fitting member relative to the partition member.

According to the liquid-sealed antivibration device described in Claim 7, in addition to the advantageous effects attained in the liquid-sealed antivibration device described in Claim 6, since the thickness dimension of the outer fitting member is set to the same dimension as the protruding dimension of the protruding portion from the outer peripheral surface of the partition member, the adhesion can be improved with which the film portion is closely adhered to the protruding portion and the outer fitting member when the second attaching member is subjected to the diameter reduction process. As a result, an improvement is made in sealing property with which a fluid-tightness is brought about between the partition member and the outer fitting member.

According to the liquid-sealed antivibration device described in Claim 8, in addition to the advantageous effects attained in the liquid-sealed antivibration device described in Claim 1, since the outer fitting member is formed with a notch section at an end portion, it can be restrained that a clearance is formed on the contact surface between the outer fitting member and the partition member when the outer fitting member is externally fitted on the partition member.

That is, at a connection section of the outer peripheral surface of the partition member to the protruding portion, a corner portion is caused by the die shaping of the partition member to swell outward, and thus, it becomes difficult to bring the axial end surface of the outer fitting member into contact with the protruding portion. However, by accommodating into the notch section the swelling portion at the connection section of the partition member to the protruding portion, it can be made easy to bring the axial end surface of the outer fitting member into contact with the protruding portion. As a result, the outer fitting member can be restrained from inclining relative to the partition member, and hence, the outer fitting member and the diaphragm can be improved in position accuracy.

DESCRIPTION OF EMBODIMENTS

Figure 1:
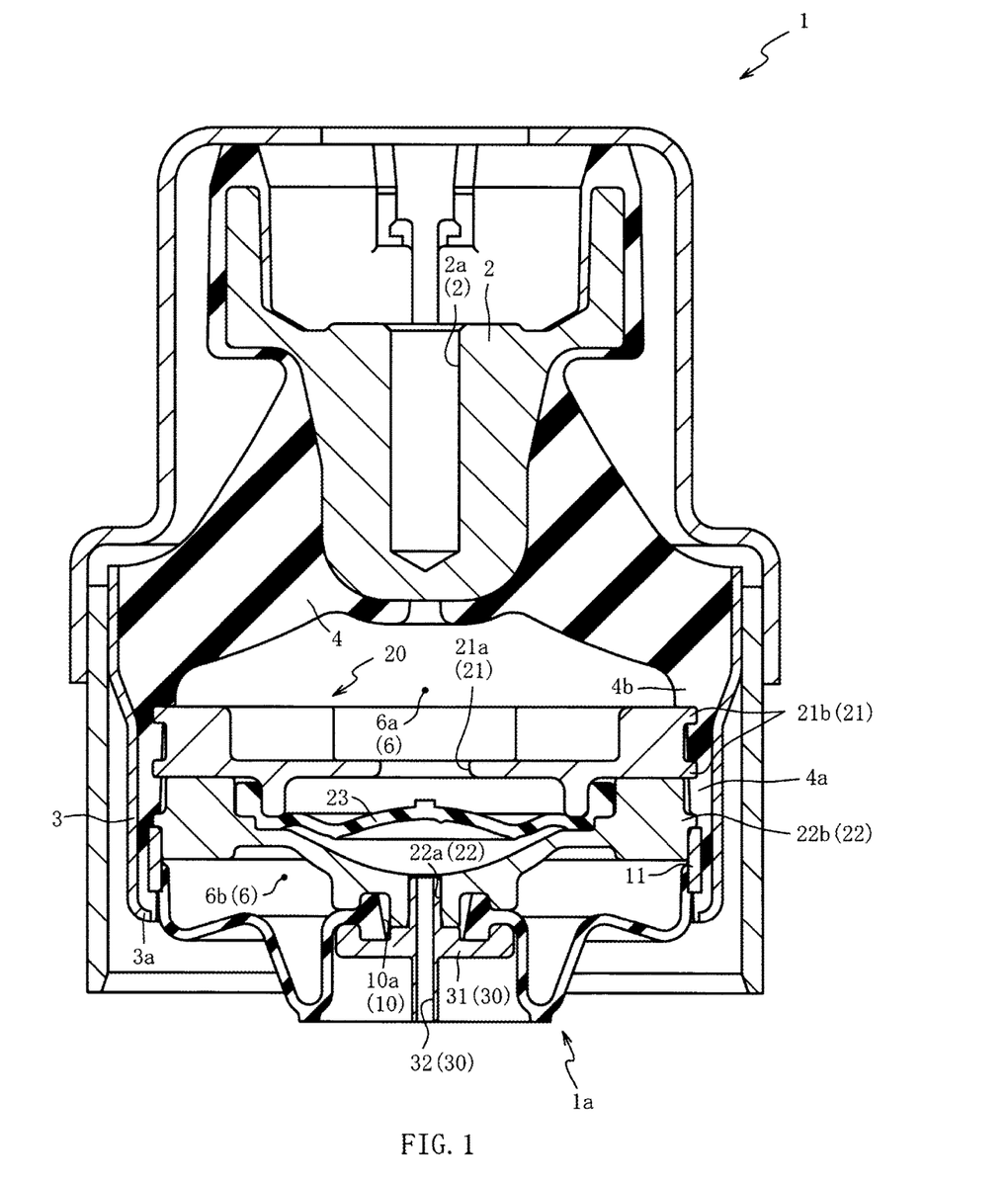
FIG. 1 is an axial sectional view of a liquid-sealed antivibration device in a first embodiment.

Hereafter, preferred embodiments of the present invention will be described with reference to the accompanying drawings. FIG. 1 is an axial sectional view of a liquid-sealed antivibration device 1 in a first embodiment of the present invention. Incidentally, "axial sectional view" means a sectional view that is taken along a plane including the center of an axis, in the axial direction.

As shown in FIG. 1, the liquid-sealed antivibration device 1 is provided with a first attaching member 2 attached to a power unit (not shown) such as an engine of a motor vehicle, a cylindrical second attaching member 3 attached to a body frame (not shown) through a bracket, and an antivibration base body 4 connecting the first attaching member 2 and the second attaching member 3 and constituted by a rubber-like elastic body.

As shown in FIG. 1, the first attaching member 2 is made of a metal material and is provided with a bolt hole 2a on the top surface. The bolt hole 2a is brought into connection with a bolt (not shown) attached to the bracket of the power unit, and hence, the first attaching member 2 is attached to a vibration source.

The second attaching member 3 is formed of a metal material in a cylindrical shape and is attached on the body frame side (not shown) through the bracket. The second attaching member 3 is formed with a caulked portion 3a bending radially inward at an end surface on the other axial side (the lower side in FIG. 1). In the state of a product shown in FIG. 1 (after a diameter reduction process), the diameter of the bending extreme end surface of the caulked portion 3a is made to be smaller than the outside diameter of an outer fitting member 11 to be described later.

The antivibration base body 4 takes the form of a truncated cone and is vulcanization-bonded to the outer peripheral surface of the first attaching member 2 at an upper end portion and to an upper-side inner peripheral surface of the second attaching member 3 at a lower end portion, respectively. A hollow portion narrowed upward is formed on a lower surface side of the antivibration base body 4, and a rubber film 4a covering the inner peripheral surface of the second attaching member 3 is connected to a stepped portion 4b at a lower end portion of the antivibration base body 4.

The rubber film 4a is a portion that holds a later-mentioned formed body 1a inside thereof and is arranged with a fixed thickness on an inner peripheral surface on the other axial side (the lower side in FIG. 1) of the second attaching member 3.

The stepped portion 4b is a portion which acts as a stopper surface when the later-mentioned formed body 1a is inserted into the rubber film 4a and is formed to connect the antivibration base body 4 to the rubber film 4a and to be thicker on the radially inner side than the rubber film 4a. Further, at a portion connected to the rubber film 4a, there is formed an end surface representing a flat surface in the radial direction (the right-left direction in FIG. 1).

On the inner surface of the rubber film 4a covering the inner peripheral surface of the second attaching member 3, a partition member 20 is disposed on one axial side (the upper side in FIG. 1), a diaphragm 10 is disposed on the other axial side (the lower side in FIG. 1), and a liquid-sealed chamber 6 is defined between the antivibration base body 4 and the diaphragm 10.

The partition member 20 is disposed on the inner peripheral surface of the rubber film 4a to divide the liquid-sealed chamber 6 into a first chamber 6a on the antivibration base body 4 side and a second chamber 6b on the diaphragm side and is provided with an orifice making communication of the first chamber 6a with the second chamber 6b.

The partition member 20 is formed to be divided into two in the axial direction and is formed by the combination in the axial direction of a first member 21 disposed on one axial side (the upper side in FIG. 1) with a second member 22 disposed on the other axial side (the lower side in FIG. 1). Further, the partition member 20 interposes a round-shaped membrane member 23 between the first member 21 and the second member 22.

The diaphragm 10 is formed by a thin, elastic rubber film with slack in the axial direction and takes a round shape as viewed in the axial direction. At a center part in the axial direction of the diaphragm 10, an opening 10a is formed passing through in the axial direction, and an air port 30 is inserted into the opening 10a.

Figure 2A:
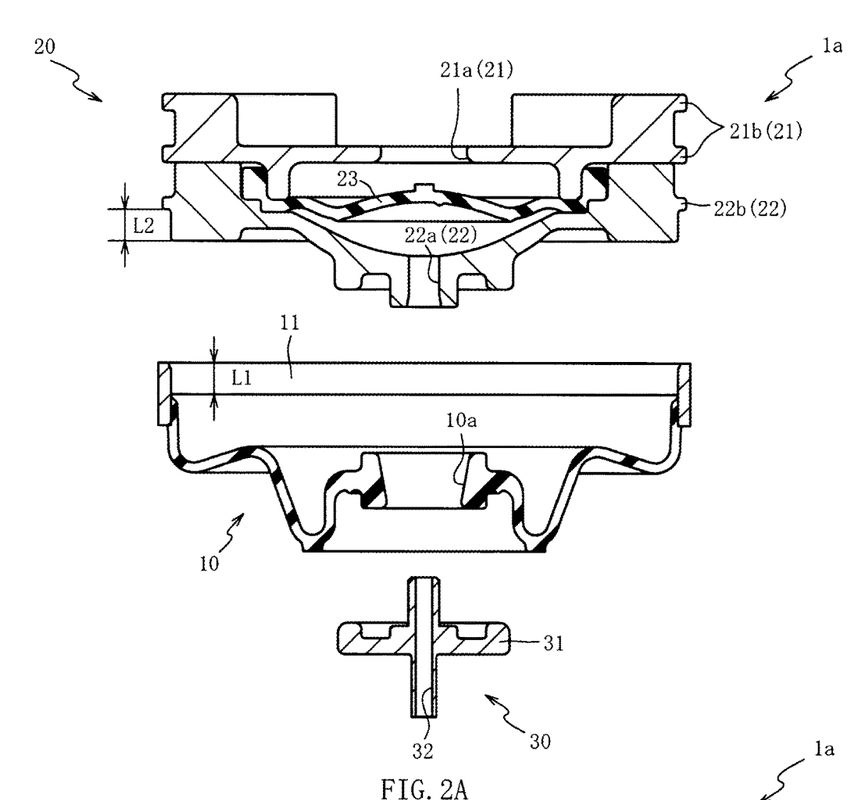
FIG. 2(a) is an exploded axial sectional view a formed body.
Figure 2B:
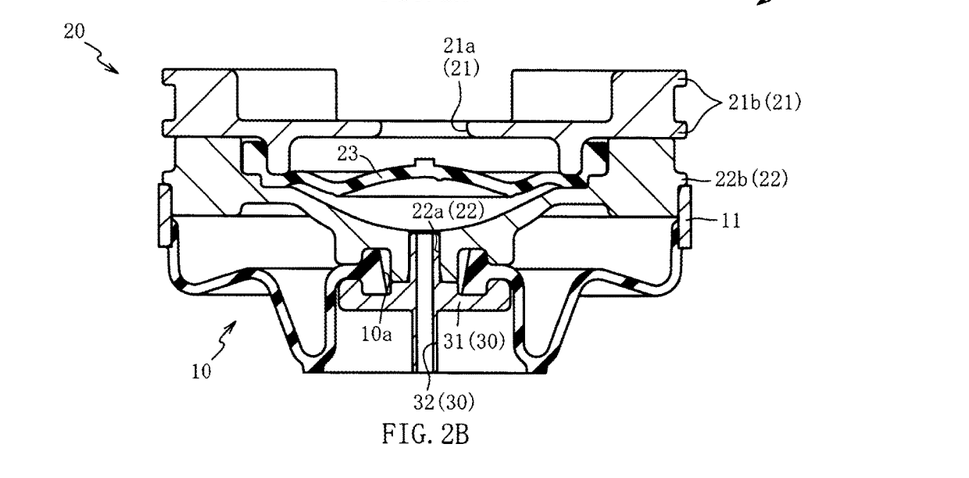
FIG. 2(b) is an axial sectional view of the formed body.

Here, the formed body 1a will be described with reference to FIG. 2. FIG. 2(a) is an exploded axial sectional view of the formed body 1a, and FIG. 2(b) is an axial sectional view of the formed body 1a. The formed body 1a is formed to be composed mainly of the partition member 20, the diaphragm 10 and the air port 30.

As shown in FIG. 2(a) and FIG. 2(b), the first member 21 of the partition member 20 is formed to have an almost rectangular section continued in the circumferential direction and take a round shape as viewed in the axial direction and is formed almost at a center part thereof with a through hole 21a passing through in the axial direction. Further, on an outer peripheral surface on the radially outer side, protruding walls 21b are formed to protrude radially outward from axially opposite ends and to continue in the circumferential direction.

The second member 22 is formed to have an almost rectangular section continued in the circumferential direction to take a round shape as viewed in the axial direction and is formed at a center part thereof with a through hole 22a passing through in the axial direction. Further, on an outer peripheral surface on the radially outer side, a protruding portion 22b is formed to protrude radially outward almost from an axial center and continue in the circumferential direction.

Incidentally, the outside diameters of the first member 21 and the second member 22 that will be described in the following embodiments are outside diameters excluding those of the protruding walls 21b and the protruding portion 22b.

As mentioned earlier, the membrane member 23 takes a round shape as viewed in the axial direction, is disposed at the axial center of the first member 21 and the second member 22 and has its outer edge part held between the first member 21 and the second member 22.

The diaphragm 10 is vulcanization-bonded to the outer fitting member 11 at the outer edge part. The outer fitting member 11 is a cylindrical member made of a metal material and is set to have a predetermined width in the axial direction and an inside diameter being slightly smaller than the outside diameter of the second member 22. That is, the outer fitting member 11 is formed to have a predetermined press-fitting margin. Further, the outer fitting member 11 is formed to be almost the same in the outside diameter as those at the extreme end surfaces of the protruding walls 21b.

The outer fitting member 11 is externally fitted (press-fitted) on the other axial side (on the lower side in FIG. 2(a) and FIG. 2(b)) of the second member 22 (the partition member 20) and is held in contact with the protruding portion 22b of the second member 22 on an end surface on one axial side (the upper side in FIG. 2(a) and FIG. 2(b)).

The diaphragm 10 is vulcanization-bonded at the outer edge part to the inner peripheral surface of the outer fitting member 11 almost from an axial center position up to an end surface on the other axial side (the lower side in FIG. 2(a) and FIG. 2(b)). In this case, the axial length L1 (refer to FIG. 2(a)) of a non-connected portion where the inner peripheral surface of the outer fitting member 11 is not connected to the diaphragm 10 is set to be longer than the axial length L2 (refer to FIG. 2(a)) from the axial end surface of the partition member 20 to the end surface on one axial side (the lower side in FIG. 2(a) and FIG. 2(b)) of the protruding portion 22b of the second member 22 (L1>L2).

Figure 5A:
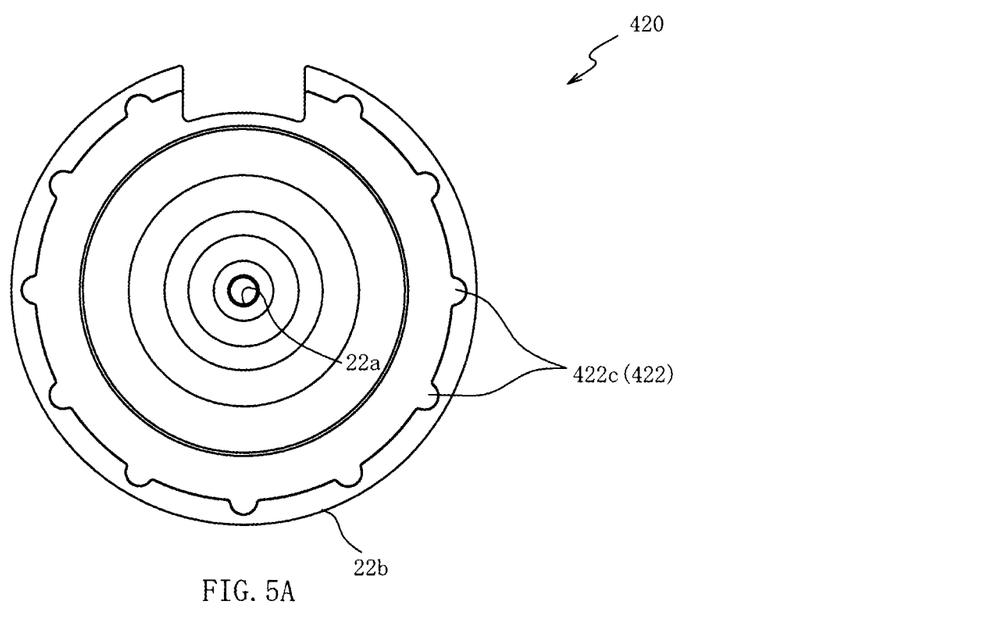
FIG. 5(a) is a bottom view of a partition member in a fourth embodiment.
Figure 5B:
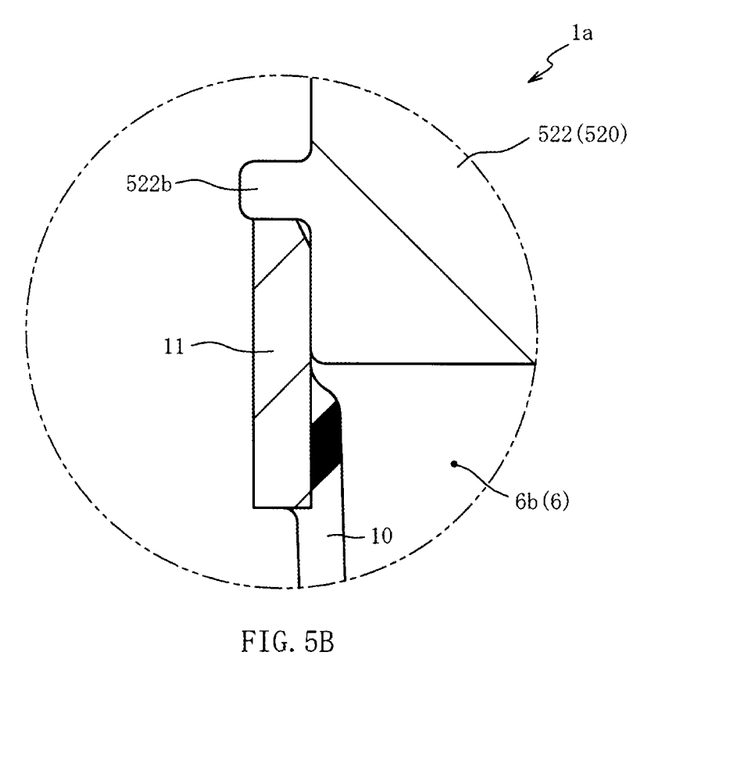
FIG. 5(b) is a partially enlarged, axial-sectional view of a formed body in a fifth embodiment.

Further, a notch section which is cut away in a taper shape is formed at an axial end portion of the inner peripheral surface on the area side to which the diaphragm 10 is not connected (refer to FIG. 5(b)). Therefore, such a situation can be restrained that when the outer fitting member 11 is externally fitted on the second member 22 (the partition member 20), a clearance is formed on the contact surface between the outer fitting member and the partition member.

That is, at the connection section of the outer peripheral surface to the protruding portion 22b of the second member 22 (the partition member 20), a corner portion is caused by the die shaping of the partition member to swell outward, and thus, it becomes difficult to bring the axial end surface of the outer fitting member 11 into contact with the protruding portion 22b. However, by accommodating into the notch section the swelling portion at the connection section of the second member 22 to the protruding portion 22b, it can be made easy to bring the axial end surface of the outer fitting member 11 into contact with the protruding portion 22b. As a result, the outer fitting member 11 can be restrained from inclining relative to the second member 22 (the partition member 20), and hence, the diaphragm attachment (the outer fitting member 11) and the diaphragm 10 can be improved in position accuracy.

The air port 30 is formed to be provided with a portion taking a cylindrical outer shape and an enlarged portion 31 radially enlarged to be disc-like almost at an axial center position. Further, the air port 30 is formed with a vent hole 32 axially passing therethrough on the axis. The outside diameter of a cylindrical portion on one axial side (the upper side in FIG. 2(*a*) and FIG. 2(*b*)) of the air port 30 is formed to be a little smaller than the inside diameter of the through hole 22*a* of the second member 22.

Then, description will be made regarding a method of assembling the partition member 20, the diaphragm 10 and the air port 30. First, description will be made regarding a method of assembling the diaphragm 10 and the partition member 20. As mentioned before, the outer fitting member 11 is formed to have the inside diameter a little smaller than the outside diameter of the second member 22 on the other axial side (the lower side in FIG. 2(*a*) and FIG. 2(*b*)) with respect to the protruding portion 22*b*, and thus, the outer fitting member 11 is externally fitted (press-fitted) on the second member 22 (the partition member 20). In this way, the diaphragm 10 vulcanization-bonded to the outer fitting member 11 can be assembled to the partition member 20.

Further, in this case, since the end surface on one axial side (the upper side in FIG. 2(*a*) and FIG. 2(*b*)) of the outer fitting member 11 is brought into contact with the end surface on the other axial side (the lower side in FIG. 2(*a*) and FIG. 2(*b*)) of the protruding portion 22*b* of the second member 22, the outer fitting member 11 can be axially positioned relative to the partition member 20. Therefore, the outer fitting member 11 can be restrained from inclining relative to the partition member 20.

Further, since the axial length L1 (refer to FIG. 2(*a*)) of the non-connected portion, which is not connected to the diaphragm 10, on the inner peripheral surface of the outer fitting member 11 is set to be longer than the axial length L2 (refer to FIG. 2(*a*)) from the axial end of partition member 20 to the end surface on one axial side (the lower side in FIG. 2(*a*) and FIG. 2(*b*)) of the protruding portion 22*b* of the second member 22, the diaphragm 10 is not interposed between the partition member 20 and the outer fitting member 11. That is, the metal-to-metal contact can make the position relation stable. Therefore, the position relation of the outer fitting member 11 to the partition member 20 can be stabilized, and this enables the outer fitting member 11 to be restrained from inclining relative to the partition member 20.

Further, since the diaphragm 10 is not interposed between the partition member 20 and the outer fitting member 11, the partition member 20 can be restrained from interfering at the end surface on the other axial side (the lower side in FIG. 2(*a*) and FIG. 2(*b*)) with the outer edge part of the diaphragm 10 when the outer fitting member 11 is externally fitted (press-fitted) on the partition member 20. Therefore, it is possible to restrain such interference from causing the damage of the diaphragm 10 and the separation at the adhesive interface between the diaphragm 10 and the outer fitting member 11.

Next, description will be made regarding a method of assembling the air port 30 and the partition member 20. As mentioned before, since the outside diameter of the cylindrical portion of the air port 30 is formed to be a little smaller than the inside diameter of the through hole 22*a*, the air port 30 and the partition member 20 can be assembled by internally fitting (press-fitting) one axial side (the upper side in FIG. 2(*a*) and FIG. 2(*b*)) of the air port 30 into the through hole 22*a*.

In this case, the enlarged portion 31 of the air port 30 holds an inner edge part of the diaphragm 10 between itself and the second member 22. That is, fixing the inner edge part of the diaphragm 10 can be done together with assembling of the air port 30. Thus, the formed body 1*a* shown in FIG. 2(*b*) can be formed.

Figure 3A:
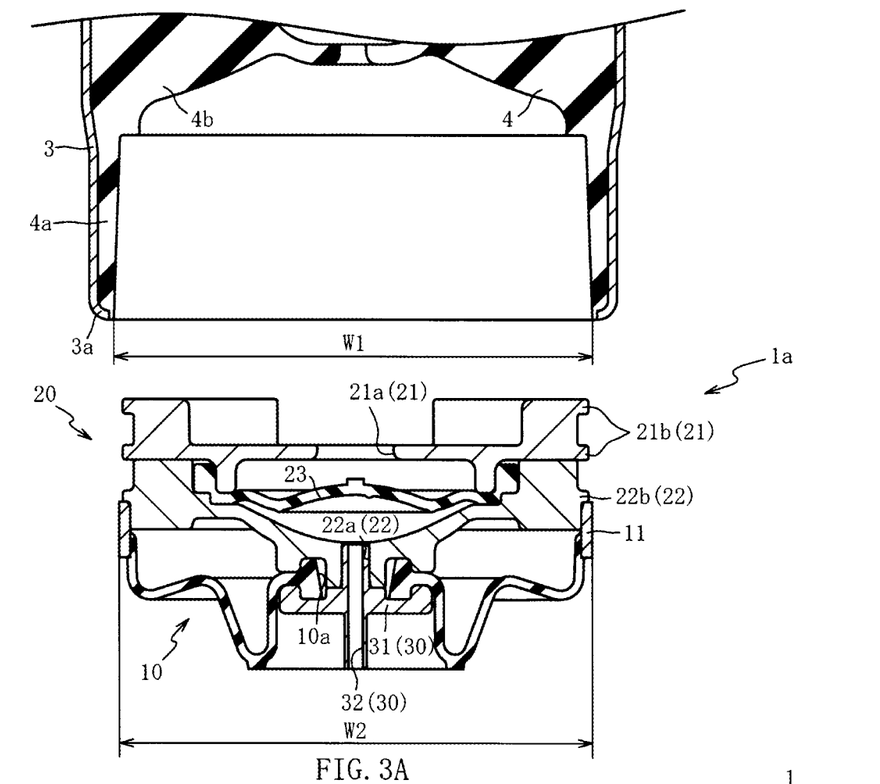
FIG. 3(a) is a partially enlarged, exploded, axial-sectional view of the liquid-sealed antivibration device before a diameter reduction process.
Figure 3B:
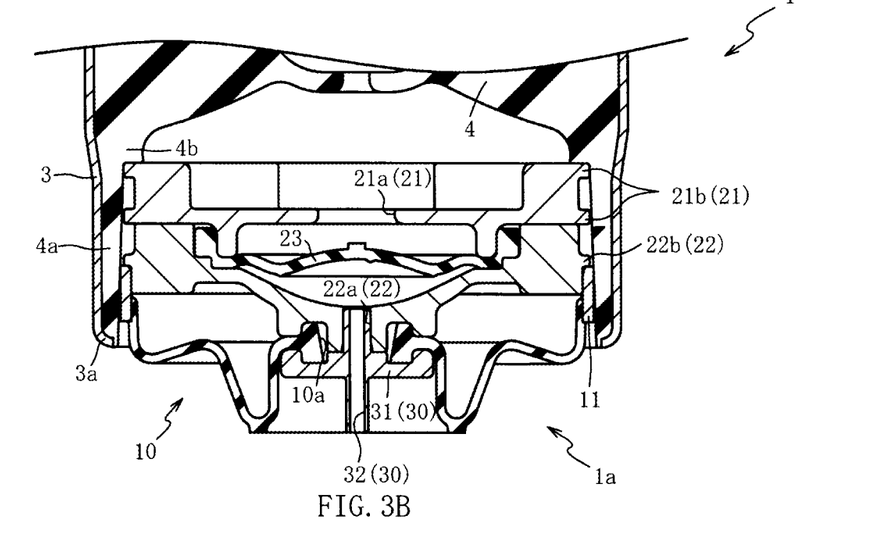
FIG. 3(b) is a partially enlarged, axial-sectional view of the liquid-sealed antivibration device before the diameter reduction process.

Next, with reference to FIG. 3, description will be made regarding a method of assembling the formed body 1*a* to the second attaching member 3. FIG. 3(*a*) is a partially enlarged, exploded axial-sectional view of the liquid-sealed antivibration device 1 before the diameter reduction process, and FIG. 3(*b*) is a partially enlarged, axial-sectional view of the liquid-sealed antivibration device 1 before the diameter reduction process.

As shown in FIG. 3(*a*), the inside diameter dimension W1 of the rubber film 4*a* before the diameter reduction process is set to be almost the same as the outside diameter dimension W2 of the formed body 1*a*. Thus, it is possible to insert the formed body 1*a* into the inner peripheral surface of the rubber film 4*a* (W1=W2).

As shown in FIG. 3(*b*), when the formed body 1*a* is inserted into the rubber film 4*a*, the end surface on one axial side (the upper side in FIG. 3(*a*) and FIG. 3(*b*)) of the formed body 1*a* can be brought into contact with the end surface on the other axial side (the lower side in FIG. 3(*a*) and FIG. 3(*b*)) of the stepped portion 4*b*. Thus, the formed body 1*a* can be positioned in the axial direction.

Finally, with the formed body 1*a* inserted inside the inner peripheral surface of the rubber film 4*a*, a lower part (the lower side in FIG. 3(*a*) and FIG. 3(*b*)) of the second attaching member 3 is subjected to the diameter reduction process to make the inside diameter of the rubber film 4*a* small. That is, the inside diameter of the rubber film 4*a* is made to be smaller than the outside diameter dimension W2 of the formed body 1*a* (the outside diameter of the outer fitting member 11). Thus, the rubber film 4*a* can closely adhere to the outer surfaces of the outer fitting member 11, the protruding walls 21*b* of the first member 21 and the protruding portion 22*b* of the second member 22, so that the formed body 1*a* can be held to be elastically supported by the elastic force of the rubber film 4*a*. As a result, the liquid-sealed antivibration device 1 (refer to FIG. 1) can be manufactured.

Further, when the lower end side (the lower side in FIGS. 3(*a*) and 3(*b*)) of the second attaching member 3 is subjected to the diameter reduction process, the diameter of the bent extreme end surface of the caulked portion 3*a* can be made smaller than the outside diameter of the outer fitting member 11, so that the formed body 1*a* can be restrained from slipping out of the interior of the second attaching member 3.

In the present embodiment, as mentioned previously, the axial length L1 (refer to FIG. 2(*a*)) of the non-connected portion which is not connected to the diaphragm 10 on the inner peripheral surface of the outer fitting member 11 is set to be longer than the axial length L2 (refer to FIG. 2(*a*)) from the axial end surface of the partition member 20 to the end surface on one axial side (the lower side in FIG. 2(*a*) and FIG. 2(*b*)) of the protruding portion 22*b* of the second member 22. Thus, such a situation can be restrained that the second attaching member 3 is subjected to the diameter reduction process with the outer fitting member 11 inclining relative to the partition member 20 or that the outer fitting member 11 inclines relative to the partition member 20 at the time of the diameter reduction process of the second attaching member 3. This enables the outer fitting member 11 and the diaphragm 10 to be improved in position accuracy.

The liquid-sealed antivibration device 1 does not interpose the diaphragm 10 between the second member 22 (the partition member 20) and the outer fitting member 11. Thus, a sealing capability cannot be secured between the second member 22 (the partition member 20) and the outer fitting member 11, and this would arouse an anxiety that the liquid from the second chamber 6b of the fluid-sealed chamber 6 leaks through a gap between them.

In the present embodiment, however, the rubber film 4a is formed up to the end surface on the other axial side (the lower side in FIGS. 3a) and (3b)) of the second attaching member 3, and when the second attaching member 3 is subjected to the diameter reduction process, the rubber film 4a is brought into close adhesion to the outer peripheral surface of the protruding portion 22b of the second member 22 (the partition member 20) and the outer peripheral surface of the outer fitting member 11. Therefore, a liquid-tight sealing can be attained between the partition member 20 and the outer fitting member 11 (the external fitting surface).

Next, a second embodiment will be described with reference to FIG. 4(a). In the first embodiment, description has been made of the case in which the outer peripheral surface of the second member 22 of the partition member 20 is continuously formed to represent a round shape as viewed in the axial direction. However, in the second embodiment, concavities 222b that are hollow radially inward are defined on the outer peripheral surface of a partition member 220.

Figure 4A:
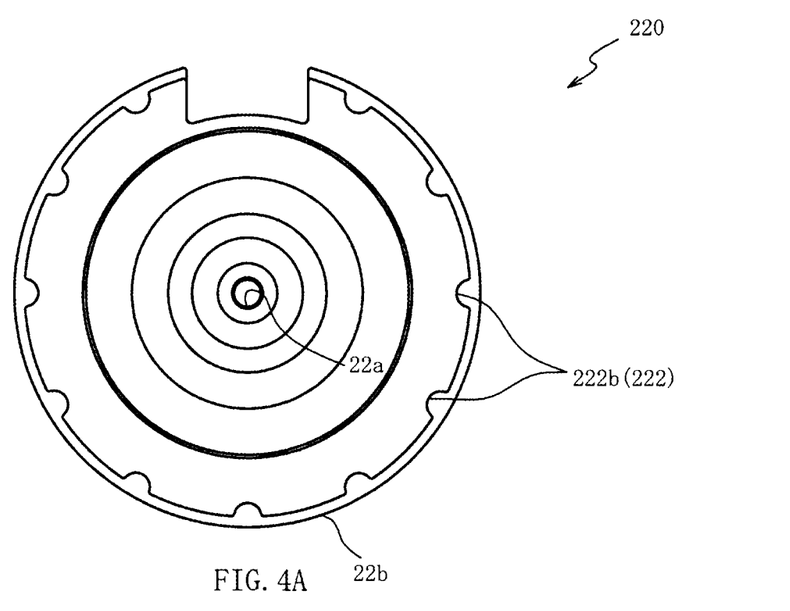
FIG. 4(a) is a bottom view of a partition member in a second embodiment.

FIG. 4(a) is a bottom view of the partition member 220 in the second embodiment. Incidentally, the same portions as those in the first embodiment will be given the same reference numerals and will be omitted in the following description.

As shown in FIG. 4(a), a second member 222 of the partition member 220 in the second embodiment is formed in a round shape wherein the outside diameter on the other axial side (the front side of the sheet surface in FIG. 4(a)) with respect to the protruding portion 22b is a little larger than the inside diameter of the outer fitting member 11 and wherein a plurality of concavities 222b being hollow radially inward are formed at predetermined intervals in the circumferential direction.

The concavities 222b are each formed to be curved in an almost semicircular shape as viewed in the axial direction and are each provided to be hollow from the end surface on the other axial side (the front side of the sheet surface in FIG. 4(a)) of the second member 222 up to the end surface on the other axial side of the protruding portion 22b. Thus, in externally fitting (press-fitting) the outer fitting member 11 on the partition member 220 (the second member 222), the contact area of the outer fitting member 11 with the partition member 220 can be made to be small, and hence, the force acting on the press-fitting can be made to be small by that amount. As a result, the outer fitting member 11 can be externally fitted (press-fitted) on the partition member 320 smoothly. Incidentally, in the second embodiment, the concavities 222b are formed at eleven places in the circumferential direction.

In this case, the same effects can be obtained by providing the concavities on the inner peripheral surface of the outer fitting member 11. However, the outer fitting member 11 like this is thin in thickness, and this makes the machining of the concavities difficult and results in lowering the strength. In contrast, in the configuration that the concavities 222b are provided to be hollow in the partition member 220 being relatively thick, the decrease in strength can be restrained. Further, determining the place for the concavities to be hollow as the outer peripheral surface of the partition member 220 makes the machining of the concavities easy in comparison with determining that as the inner peripheral surface of the outer fitting member 11.

Next, a third embodiment will be described with reference to FIG. 4(b). In the first embodiment, description has been made of the case wherein the outer peripheral surface of the second member 22 of the partition member 20 is formed in a round shape as viewed in the axial direction. In the third embodiment, however, a second member 322 of a partition member 320 is formed with notches 322b cut away radially inward on the outer peripheral surface.

Figure 4B:
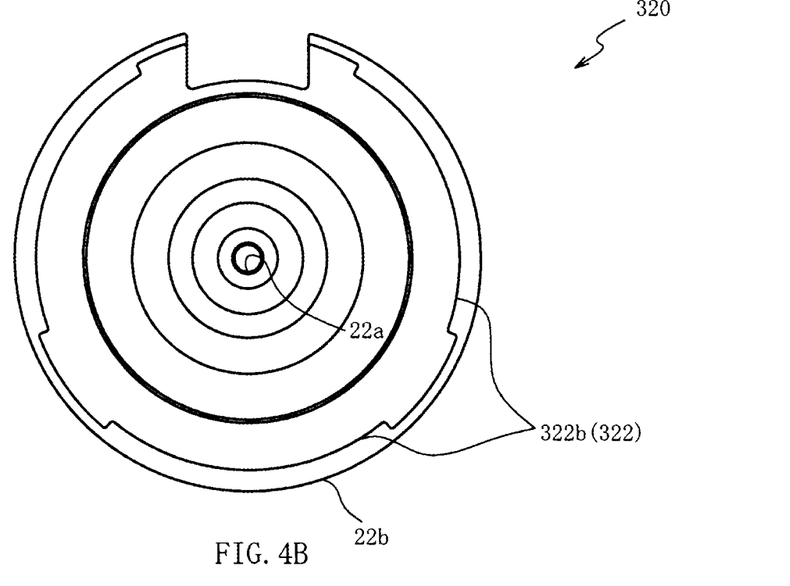
FIG. 4(b) is a bottom view of a partition member in a third embodiment.

FIG. 4(b) is a bottom view of the partition member 320 in the third embodiment. Incidentally, the same portions as those in the first embodiment will be given the same reference numerals and will be omitted in the following description.

As shown in FIG. 4(b), the second member 322 of the partition member 320 in the third embodiment is formed in a round shape wherein the outside diameter on the other axial side (the front side of the sheet surface in FIG. 4(a)) with respect to the protruding portion 22b is a little larger than the inside diameter of the outer fitting member 11 and wherein a plurality of notches 322b being hollow radially inward are formed at predetermined intervals in the circumferential direction.

The notches 322b are each formed to be hollow and longer in the circumferential direction than the concavity 222b in the second embodiment. The notches 322b are formed to be hollow from the end surface on the other axial side (the front side of the sheet surface in FIG. 4(b)) to the end surface on the other axial side of the protruding portion 22b. Thus, in externally fitting (press-fitting) the outer fitting member 11 on the second member 322 (the partition member 20), the contact area of the outer fitting member 11 with the second member 322 can be made smaller than that in the second embodiment, and hence, the force acting on the press-fitting can be made to be small by that amount. As a result, the outer fitting member 11 can be externally fitted (press-fitted) on the second member 322 smoothly. Incidentally, in the third embodiment, the notches 322b are formed at three places in the circumferential direction.

Next, a fourth embodiment will be described with reference to FIG. 5(a). In the first embodiment, description has been made of the case wherein the outer peripheral surface of the second member 22 of the partition member 20 is continuously formed in a round shape as viewed in the axial direction. In the fourth embodiment, however, a second member 422 of the partition member 20 is formed with convex portions 422c protruding radially on the outer peripheral surface.

FIG. 5(a) is a bottom view of the partition member 20 in the fourth embodiment. Incidentally, the same portions as those in the first embodiment will be given the same reference numerals and will be omitted in the following description.

As shown in FIG. 5(a), the second member 422 of the partition member 20 in the fourth embodiment is formed in a round shape as viewed in the axial direction whose outside diameter is smaller than the inside diameter of the outer fitting member 11 and is formed with a plurality of the convex portions 422c which protrude radially outward from the outer peripheral surface at predetermined intervals in the circumferential direction.

The convex portions 422c each take a convex shape which is curved almost semicircularly as viewed in the axial direction, and are each provided to protrude from the end surface on the other axial side (the front side of the sheet surface in FIG. 5(a)) up to the end surface on the other axial side of the protruding portion 22b. Further, the length from the axis of the second member 422 to the top of protrusion of each convex portion 422c is formed to be a little larger than the radius of the inside diameter of the outer fitting member 11. That is, an imaginary circle that is drawn to pass through the protruding tops of the convex portions 422c is formed to be a little larger in diameter than the inside diameter of the outer fitting member 11. Incidentally, in the fourth embodiment, the convex portions 422c are formed at eleven places in the circumferential direction.

Thus, in externally fitting (press-fitting) the outer fitting member 11 on the second member 422 (the partition member 20), the tops of the convex portions 422c become contact portions of the second member 422 with the inner peripheral surface of the outer fitting member 11, and hence, the contact area of the outer fitting member 11 with the second member 422 can be made small by that amount. As a result, the outer fitting member 11 can be externally fitted (press-fitted) on the second member 422 smoothly.

That is, since the second member 422 (the partition member 20) is formed with the convex portions 422c whose extreme ends each take a semicircularly curved shape as viewed in the axial direction and since the extreme ends of the convex portions 422c are held in contact with the inner peripheral surface of the outer fitting member 11, the outer fitting member 11 can be externally fitted on the second member 422 with the extreme ends of the convex portions 422c held in contact with the outer fitting member 11. Therefore, since it is possible to confine the contact area between the second member 422 and the outer fitting member 11 only to the extreme end surfaces of the convex portions 422c, the contact area between the second member 422 and the outer fitting member 11 can be made small by that amount. As a result, the outer fitting member 11 can be externally fitted on the second member 422 (the partition member 20) smoothly.

Next, a fifth embodiment will be described with reference to FIG. 5(b). In the first embodiment, description has been made of the case wherein the outside diameter of the outer fitting member 11 is formed to be larger than the outside diameter at the protruding extreme end of the protruding portion 22b of the partition member 20 (the second member 22). In the fifth embodiment, however, the outside diameter of the protruding extreme end surface of a protruding portion 522b of the partition member 20 (a second member 522) is formed to be larger than the outside diameter of the outer fitting member 11.

FIG. 5(b) is a partially enlarged, axial-sectional view of the formed body 1a in the fifth embodiment. Incidentally, the same portions as those in the first embodiment will be given the same reference numerals and will be omitted in the following description.

As shown in FIG. 5(b), the second member 522 of a partition member 520 in the fifth embodiment is formed so that the protruding portion 522b is larger radially outward than the protruding portion 22b in the first embodiment and that the outside diameter at the protruding extreme end is larger than the outside diameter of the outer fitting member 11. In other words, the thickness dimension of the outer fitting member 11 is set to be a smaller dimension than the protruding dimension of the protruding portion 522b. Therefore, the outer peripheral surface of the outer fitting member 11 resides radially inside of the protruding extreme end of the protruding portion 522b.

Thus, when the partition member 520 (the second member 522) with the outer fitting member 11 externally fitted (press-fitted) thereon is inserted into the second attaching member 3, such a situation can be restrained that a resistance in the opposite direction to the inserting direction acts from the rubber film 4a to the outer fitting member 11 to cause the position aberration of the outer fitting member 11 relative to the partition member 520.

Specifically, where the outer fitting member 11 is located outside of the extreme end of the protruding portion 22b, the outer peripheral surface of the outer fitting member 11 tends to come into contact with the inner peripheral surface of the rubber film 4a vulcanization-bonded to the inner surface of the second attaching member 3 before the protruding portion 22b. According to the fifth embodiment, however, since a corner portion on the outer peripheral side of the outer fitting member 11 is located radially inside the protruding extreme end of the protruding portion 522b, it can be made hard for the outer peripheral surface of the outer fitting member 11 to come into contact with the inner peripheral surface of the rubber film 4a. Therefore, it can be realized to improve the position accuracy of the outer fitting member 11 relative to the partition member 520.

Although having been described based on the embodiments as described hereinabove, the present invention is not in any way limited to the aforementioned embodiments, and it is easily inferable that various improvements and modifications are possible without departing from the gist of the present invention.

Although, in each of the foregoing embodiments, a case in which the partition member 20, 220, 320, 420, 520 and the outer fitting member 11 are made of metal materials has been described, these members are not necessarily limited to that case. For example, both or either one of the partition member 20, 220, 320, 420, 520 and the outer fitting member 11 may be made of a flexible material.

Although a case in which the protruding portion 22b or 522b is formed continuously in the circumferential direction has been described in each of the foregoing embodiments, the protruding portion 22b or 522b is not necessarily limited to that case. For example, the protruding portion may be as those protruding radially outward from a plurality of places at predetermined intervals in the circumferential direction.

In this case, it is preferable to provide the protruding portions 22b, 522b at least at three places. Since the protruding portions 22b, 522b serve to position the outer fitting member 11 in the axial direction, the positioning at two places or one place makes it difficult to perform the positioning accurately. To the contrary, forming the protruding portions at least at three places makes it possible to improve the positioning accuracy of the outer fitting member 11 in the axial direction.

Although a case in which the outer peripheral surface of the outer fitting member 11 is located radially outside or inside of the extreme end of the protruding portion 522b has been described in the foregoing first or fifth embodiment, the outer peripheral surface of the outer fitting member 11 is not necessarily limited to that case and may be the same in outside diameter as the extreme end of the protruding portion 522b.

In this case, in addition to the advantageous effects attained in the first or fifth embodiment, it can also be attained that because the extreme end surface of the protruding portion 522b agrees with the outer peripheral surface of the outer fitting member 11, the adhesion is improved with which the rubber film 4a is closely adhered to the protruding portion 522b and the outer fitting member 11 when the second attaching member 3 is subjected to the diameter reduction process. As a result, the sealing property can be improved which brings about fluid-tightness between the partition member 20 and the outer fitting member 11 (the external fitting surface).

The invention claimed is:

1. A liquid-sealed antivibration device comprising a first attaching member, a cylindrical second attaching member, an antivibration base body connecting the first attaching member and the second attaching member and constituted by a rubber-like elastic body, a diaphragm defining a liquid-sealed chamber between itself and the antivibration base body and constituted by a rubber-like elastic body, a partition member dividing the liquid-sealed chamber into a first chamber on the antivibration base body side and a second chamber on the diaphragm side, and an orifice making communication between the first chamber and the second chamber, wherein:
    there is provided a cylindrical outer fitting member with an outer edge part of the diaphragm connected to the cylindrical outer fitting member;
    the outer fitting member is externally fitted around an outer circumferential surface in a radial direction of the partition member at an area on an inner peripheral surface of the outer fitting member in a radial direction and where the diaphragm is not connected;
    the partition member is provided with a protruding portion which protrudes radially outward from an outer peripheral surface and with which an axial end surface of the externally fitted outer fitting member is brought into contact;
    there is provided a film portion connected to the antivibration base body, arranged at an inner peripheral surface of the second attaching member and constituted by a rubber-like elastic body; and
    the film portion is closely adhered to the protruding portion of the partition member and the outer fitting member.

2. The liquid-sealed antivibration device according to claim 1, wherein the outer fitting member is set so that the axial length of the area where the diaphragm is not connected to the inner peripheral surface of the outer fitting member is longer than the axial length from an axial end surface of the partition member to the protruding portion.

3. The liquid-sealed antivibration device according to claim 1, wherein concavities are provided to be hollow on the outer peripheral surface of the partition member.

4. The liquid-sealed antivibration device according to claim 1, wherein the partition member is provided with convex portions which protrude radially outward from its outer peripheral surface and are arranged to be distributed in the circumferential direction; and
    wherein extreme ends of the convex portions each take a semicircularly curved shape as viewed in the axial direction and are held in contact with the inner peripheral surface of the outer fitting member.

5. The liquid-sealed antivibration device according to claim 1, wherein the thickness dimension of the outer fitting member is set to the same dimension as, or a smaller dimension than, the protruding dimension of the protruding portion from the outer peripheral surface of the partition member.

6. The liquid-sealed antivibration device according to claim 5, wherein the thickness dimension of the outer fitting member is set to the same dimension as the protruding dimension of the protruding portion from the outer peripheral surface of the partition member.

7. The liquid-sealed antivibration device according to claim 1, wherein the outer fitting member is provided with a notch section which is cut away in a taper shape at an axial end portion of an inner peripheral surface on the area side where the diaphragm is not connected.

\* \* \* \* \*